US012802471B2

(12) United States Patent
Vecchio et al.

(10) Patent No.: US 12,802,471 B2
(45) Date of Patent: Nov. 17, 2026

(54) GENERATING DESCRIPTIVE TAGS FOR IMAGES THAT CHARACTERIZE A CONDITION OF UTILITY ASSETS

(71) Applicant: Florida Power & Light Company, Juno Beach, FL (US)

(72) Inventors: Mackenzie Vecchio, Boca Raton, FL (US); Christopher H. Mclemore, Jupiter, FL (US); Andre Rashard Williams, West Palm Beach, FL (US); Richard A. Bauder, Juno Beach, FL (US); Stephen S. Cross, North Palm Beach, FL (US); David J. Sunderman, Loxahatchee, FL (US); Dmitri Soroka, Royal Palm Beach, FL (US); Rohan N. Shah, Palm Beach Gardens, FL (US); Kyle A. Bush, Palm Beach Gardens, FL (US); Paul R. Hynes, Jupiter, FL (US); Eric D. Schwartz, Palm Beach Gardens, FL (US)

(73) Assignee: Florida Power & Light Company, Juno Beach, FL (US)

( * ) Notice: Subject to any disclaimer, the term of this patent is extended or adjusted under 35 U.S.C. 154(b) by 243 days.

(21) Appl. No.: 18/680,165

(22) Filed: May 31, 2024

(65) Prior Publication Data

US 2025/0371892 A1 Dec. 4, 2025

(51) Int. Cl.
*G06V 20/70* (2022.01)
*G06F 16/538* (2019.01)
(Continued)

(52) U.S. Cl.
CPC ............ *G06V 20/70* (2022.01); *G06F 16/538* (2019.01); *G06F 16/5866* (2019.01); *G06V 10/25* (2022.01); *G06V 2201/07* (2022.01)

(58) Field of Classification Search
CPC .... G06V 20/70; G06V 10/25; G06V 2201/07; G06V 10/82; G06V 10/764; G06V 20/52; G06V 10/774; G06V 10/255; G06V 20/13; G06V 20/17; G06V 2201/08; G06F 16/538; G06F 16/5866; G06T 2207/20081; G06T 2207/20084; G06T 7/0004; G06T 7/001;
(Continued)

(56) References Cited

U.S. PATENT DOCUMENTS 10,032,267 B2 * 7/2018 Strebel .................. G01S 7/4802
10,217,207 B2 * 2/2019 Marra .................... G01C 11/00
(Continued)

*Primary Examiner* — Michael S Osinski
(74) *Attorney, Agent, or Firm* — Fish & Richardson P.C.

(57) ABSTRACT

A condition generator analyzes a set of utility asset images of a particular utility asset using the ML (machine learning) model identify a type and condition of the particular utility asset depicted in the set of utility asset images. The identified condition is assigned a confidence score, and the set of utility asset images includes at least two images of the particular utility asset captured at different angles. The condition generator generates a descriptive tag for the set of utility asset images based on the identified type and condition. The descriptive tag characterizes an operational status of the particular utility asset. The condition generator stores the set of utility asset images and the generated descriptive tag in a utility asset database. The utility asset database stores images of utility assets.

19 Claims, 11 Drawing Sheets

(51) Int. Cl.
*G06F 16/58* (2019.01)
*G06V 10/25* (2022.01)

(58) Field of Classification Search
CPC ......... G06T 2207/30164; G06T 7/0002; G06T 2207/30252; G06T 7/11; G06T 7/70; G06T 2207/10032; G06T 2207/30232; G06T 5/50; G06T 2207/10016; G06T 2207/30184; G06T 2207/30248; G06T 2207/30108; G06N 3/09; G06N 3/0464; G06N 3/045; G06N 3/08; G06Q 10/20; G06Q 40/08; G06Q 10/06395; G06Q 30/0283
See application file for complete search history.

(56) References Cited

U.S. PATENT DOCUMENTS

| | | | | |
|---|---|---|---|---|
| 10,475,208 | B1 * | 11/2019 | Morrison | G06Q 30/0278 |
| 10,607,107 | B2 * | 3/2020 | Barzelay | G06V 10/751 |
| 10,755,437 | B2 | 8/2020 | Sugahara et al. | |
| 11,468,551 | B1 * | 10/2022 | Amouie | G06F 18/214 |
| 11,521,273 | B2 | 12/2022 | Jakka et al. | |
| 11,836,968 | B1 * | 12/2023 | Blanchard | G06T 7/11 |
| 12,205,309 | B2 * | 1/2025 | Blonder | G06T 5/50 |
| 12,548,082 | B1 * | 2/2026 | Katz | G06Q 40/08 |
| 2013/0114878 | A1 * | 5/2013 | Scheid | G06T 7/001 382/141 |
| 2016/0321513 | A1 * | 11/2016 | Mitti | G06V 20/63 |
| 2017/0352199 | A1 * | 12/2017 | Finley | G06T 7/13 |
| 2018/0293552 | A1 * | 10/2018 | Zhang | G06Q 10/20 |
| 2019/0145183 | A1 * | 5/2019 | Potash | E21B 10/00 700/175 |
| 2021/0027485 | A1 * | 1/2021 | Zhang | G06Q 50/12 |
| 2021/0073692 | A1 | 3/2021 | Saha et al. | |
| 2021/0342997 | A1 * | 11/2021 | Malreddy | G06F 18/214 |
| 2021/0374111 | A1 * | 12/2021 | Harvey | G01C 21/3807 |
| 2022/0058591 | A1 * | 2/2022 | Xiong | G06V 10/82 |
| 2022/0162012 | A1 * | 5/2022 | Nokelby | B65G 43/08 |
| 2022/0327684 | A1 * | 10/2022 | Cao | G06Q 10/20 |
| 2022/0358764 | A1 * | 11/2022 | Qian | G06V 20/176 |
| 2022/0358775 | A1 * | 11/2022 | Hantehzadeh | G06T 7/11 |
| 2022/0414300 | A1 * | 12/2022 | Odisio | G06F 30/27 |
| 2023/0009954 | A1 * | 1/2023 | Blonder | G06T 7/254 |
| 2023/0063604 | A1 * | 3/2023 | Al Daif | E21B 47/117 |
| 2023/0377047 | A1 * | 11/2023 | Bouëtté | G06Q 40/08 |
| 2024/0013266 | A1 * | 1/2024 | Yoshimi | G06T 7/0004 |
| 2024/0177293 | A1 * | 5/2024 | Tatemizo | G01N 21/8851 |
| 2024/0193917 | A1 * | 6/2024 | Blanchard | G06V 10/764 |
| 2025/0037486 | A1 * | 1/2025 | Lee | G06V 10/764 |
| 2025/0108918 | A1 * | 4/2025 | Bowden | B64D 1/18 |
| 2025/0148758 | A1 * | 5/2025 | Wang | G06T 11/00 |
| 2025/0332732 | A1 * | 10/2025 | Kim | B25J 9/1697 |

* cited by examiner

600

| INDEX | FLIGHT_DATE | UPLOAD_DATE | URI | LAT | LONG | ROLL | PITCH | YAW | FEEDER_NAME | POLE_ID | TAGS |
|---|---|---|---|---|---|---|---|---|---|---|---|
| NUMBER | DATE AND TIME | DATE AND TIME | FILE ADDRESSS | NUMBER | NUMBER | NUMBER | NUMBER | NUMBER | NAME AND NUMBER | NUMBER | DELINEATED STRING TEXT |

604 608

FIG. 6A

650

| | | | | | | |
|---|---|---|---|---|---|---|
| No Lean | Pole not Leaning | WD | Wood | TX | Transformer | Veg |
| Lean | Leaning Pole | CONC | Concrete | SL | Streetlight (Broken/Twisted/Missing) | PMTX FLD |
| Broken | Broken Pole | STL | Steel | PMDS | Padmount Switch Cabinet | PMDS |
| No Damage | No Damage seen | | | RS | Riser Shield(Feeder, Primary, and Secondary) | Debris |
| | | | | CAP BANK | Capacitor Bank | SEC |
| | | | | FS | Fuse Switch (Blown) | Wire Down |
| | | | | LA | Surge Arrester Damage (Blown,Offline, or Missing) | X ARM |
| | | | | ALS | ALS opened/Damaged | INS |
| | | | | AFS | AFS Damaged | |

FIG. 6B

GENERATING DESCRIPTIVE TAGS FOR IMAGES THAT CHARACTERIZE A CONDITION OF UTILITY ASSETS

TECHNICAL FIELD

The present disclosure relates to image processing and more particularly to systems and methods for generating descriptive tags of images of utility assets that characterize a condition of the utility assets.

BACKGROUND

In the field of utility management, the monitoring and maintenance of utility assets, such as transmission lines, transformers, and other electrical distribution equipment, are needed to ensuring reliable service delivery. Conventionally, this involves the manual inspection of utility assets, often following environmental events that could impact operational status of the utility assets. The advent of imaging technology, particularly the use of drones and handheld devices, has enabled the collection of vast quantities of visual data from utility assets in various environments and conditions.

ML (machine learning) image processing is a dynamic and rapidly evolving field that leverages AI (artificial intelligence) to enable computers to interpret and understand visual data. By applying algorithms that can learn from and make decisions based on data, ML models can automatically recognize patterns, classify objects and detect anomalies within images. In the realm of image processing, ML techniques such transformer neural networks are adept at handling complex visual inputs, extracting features and converting the features into actionable insights.

SUMMARY

A first example relates to a non-transitory machine-readable medium having machine-readable instructions, the machine-readable instructions including an asset condition generator causing at least one processor to execute operations based on parameters of an ML (machine learning) model. The operations of the asset condition generator include analyzing a set of utility asset images of a particular utility asset using the ML model identify a type and condition of the particular utility asset depicted in the set of utility asset images. The identified condition is assigned a confidence score and the set of utility asset images includes at least two images of the particular utility asset captured at different angles. The operations also include generating a descriptive tag for the set of utility asset images based on the identified type and condition. The descriptive tag characterizes an operational status of the particular utility asset. The operations include storing the set of utility asset images and the generated descriptive tag in a utility asset database. The utility asset database stores images of utility assets.

A second example relates to a system for managing utility asset conditions. The system includes a non-transitory memory for storing data and machine-readable instructions and at least one processor that accesses the non-transitory memory and executes the machine-readable instructions. The machine-readable instructions include an asset condition generator for processing a set of utility asset images using an ML (machine learning) model to identify a type and condition of a particular utility asset depicted in the set of utility asset images. The set of utility asset images includes at least two images of the particular utility asset captured at different angles. The asset generator is also for generating a descriptive tag for the set of utility asset images based on the identified type and condition. The descriptive tags characterize operational status of the particular utility asset. The asset generator is for storing the set of utility asset images and the generated descriptive tag in a utility asset database. The utility asset database stores images of utility assets.

A third example relates to a method for adding descriptive tags to infrastructure asset images. The method includes receiving an asset condition generator executing on a computer, a set of infrastructure asset images captured by image sources. The method also includes analyzing, by the asset condition generator, the set of infrastructure asset images using an ML model to determine a condition of a particular infrastructure asset depicted in the set of infrastructure asset images. The set of infrastructure asset images includes at least two images of the particular infrastructure asset captured at different angles. The method includes generating, by the asset condition generator, a descriptive tag for the set of infrastructure asset images based on the determined condition. The descriptive tags indicate an operational status of the particular infrastructure asset. The method includes storing, by the asset condition generator, the set of infrastructure asset images and the generated descriptive tag in a infrastructure asset database. The infrastructure asset database stores images of infrastructure assets.

BRIEF DESCRIPTION OF THE DRAWINGS

FIG. 6A illustrates an example of a schema for an indexed list of utility asset images.

FIG. 6B illustrates a table that has examples of text codes that could be included in the descriptive tag added to an indexed list of asset utility images.

DETAILED DESCRIPTION

Figure 1:
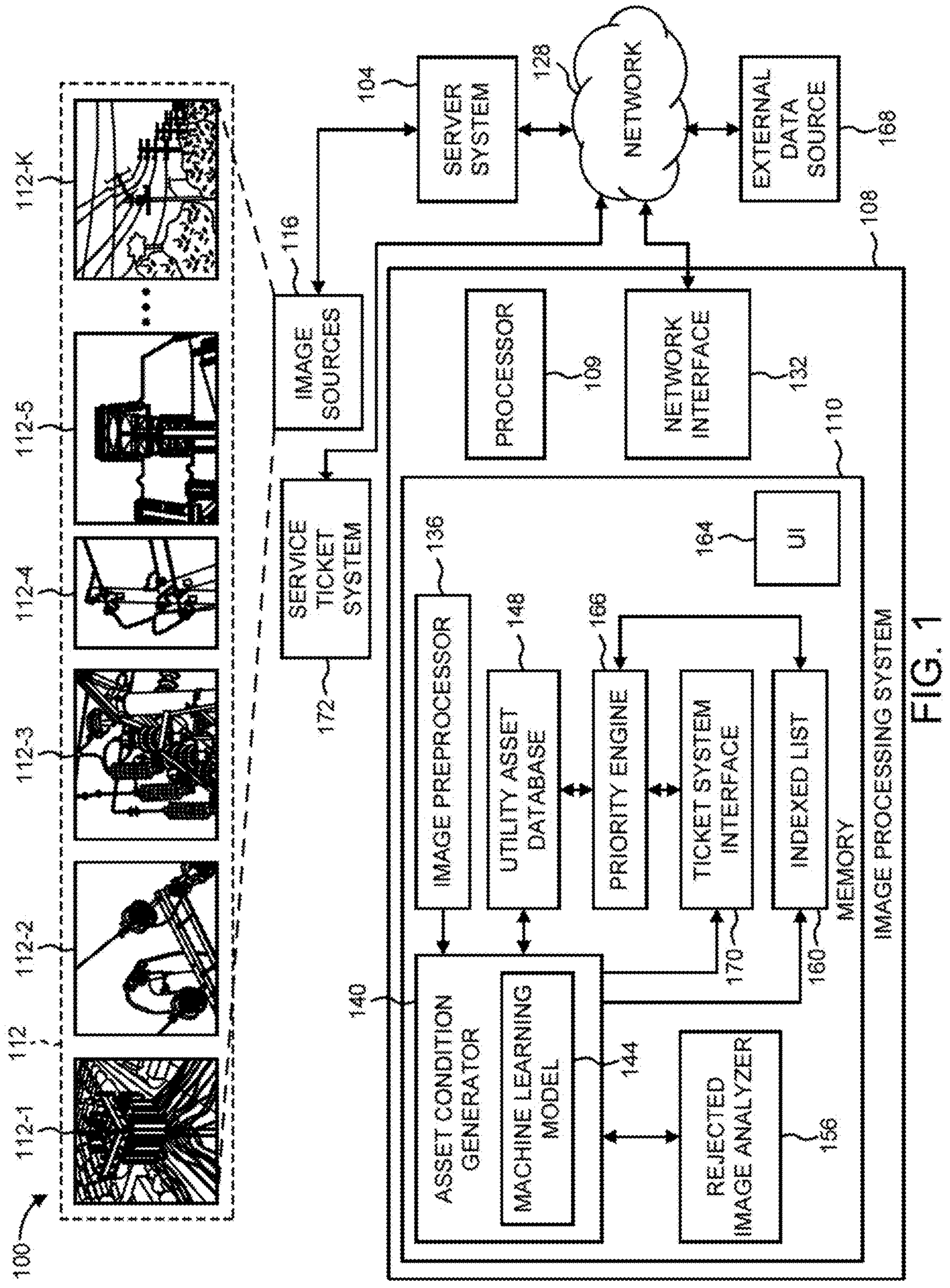
FIG. 1 illustrates a system for generating descriptive tags of utility asset images.

Conventionally, descriptive tags for images have involved manual inspection and tagging by human operators. This manual process is time-consuming, labor-intensive and prone to errors due to subjective interpretations. Additionally, the scalability of manual tagging is limited, making it challenging to process a large volume of utility asset images efficiently. Automated tagging systems have been developed to address these limitations, utilizing various image processing techniques and rule-based algorithms to classify utility assets based on predefined criteria. However, these systems often lack the flexibility to adapt to diverse asset conditions and may struggle with accurately identifying nuanced variations in asset types and conditions.

To address these issues, this description relates to an asset condition generator with an ML (machine learning) model that is employable to analyze images of a utility asset situated on a utility pole to determine a condition of the asset. These images can be referred to as utility asset images. These utility assets can be, for example, transmission lines, ALSs (automatic lateral switches), transformers, jumpers or nearly any other utility asset employed for electrical transmission and/or distribution. The utility asset images can be captured from a drone (e.g., a camera mounted on the drone), or by a deployed crew member (e.g., using a smartphone, a tablet computer, etc.). The condition can indicate, among other things, an operational status of the asset, which is employable to determine whether maintenance of the asset is needed.

The ML model can be trained from a neural network, such as a transformer neural network or other ML algorithm. The ML model is trained to convert input images into vectors (e.g., a matrix of numbers) and to add a descriptive tag (e.g., text) for each input image. In some examples, the tag for the input image can be stored in a utility asset database that can include an index to a copy of the input image. The ML model can employ a set of images (multiple images) of the same utility asset and/or images of a same type of utility asset to determine the condition of the asset. In these situations, each image in the set of images could be captured at different angles. Accordingly, some conditions of a particular utility asset might only be visible in certain utility asset images of the set of utility asset image. Accordingly, providing the set of utility asset images improves the performance of the asset condition generator by ensuring that more conditions are detectable. In some examples, an image in the set of images includes a bounding box that contains a text or symbol to positively verify (or refute) the content within the bounding box. The ML model can employ this information as back-propagation and/or reinforcement data to tune the parameters of the ML model and improve operating performance.

In some examples, the condition reported by the ML model can indicate how a given asset is connected to other assets, which can characterize a state of the utility asset. For instance, suppose that the given asset is a jumper used to connect different segments of a transmission line. In this situation, the condition for the given asset could identify the asset as a jumper and provide an identifier for the transmission line segments connected to the jumper. In other examples, the condition can characterize an operational status of a given asset. For example, suppose that the given asset is a transformer. In this situation, the condition assigned by the ML model (included in the descriptive tag) could indicate if the transformer has corrosion or other condition that might require maintenance.

In some situations, the condition characterized in the set of images is employable to generate a prioritized worklist for a service ticket system that deploys service crews. For example, in some situations, such as an image of a downed wire (e.g., an image of a transmission line with a condition of downed), the system employing the ML model can send a maintenance request to the service ticket system identifying the transmission line, the condition of the transmission line and a location of the transmission line. In response, the service ticket system can generate a service ticket to deploy a service crew to remedy the problem. In other examples, the condition of an asset might identify a lower priority problem. For instance, suppose that an ALS has a fuse installed temporarily. In this situation, an image of a feeder line that should indicate an operatable ALS instead indicates an operable fuse. In this situation, the system can provide a notification of a maintenance request to replace the fuse with an ALS.

The system can be queried with a dashboard interface. In some situations, the dashboard can search the indexed list and/or the utility asset database based on a string of keywords provided by a user. The system can cross-reference the utility asset database to identify images corresponding to the keywords in the string. By employing the ML model, the need to manually add descriptions to thousands (or hundreds of thousands) of images captured by drones and/or service crews is obviated. Instead, the ML model automatically adds the descriptive tags to identify conditions of utility assets.

FIG. 1 illustrates a system 100 for adding descriptive tags to utility asset images (e.g., images of utility assets that are on or proximate to a utility pole). The utility asset images are captured by a drone or a deployed during or after an environmental emergency event, such as a weather event (e.g., a hurricane, a flood, a tsunami, a tornado, etc.) or a geothermal event (e.g., an earthquake, a volcano eruption, etc.). The system 100 includes a server system 104 and an image processing system 108. The server system 104 can be implemented as one or more computing devices, such as one or more servers that execute application software on top of an operating system. That is, the server system 104 may be implemented as a combination of hardware and software. The server system 104 is configured to receive K number of utility asset images 112 from a plurality of image sources 116, where K is an integer greater than or equal to two (2). The utility asset images 112 are provided as utility asset image 112-1 (e.g., a transformer), utility asset image 112-2 (e.g., a jumper), utility asset image 112-3 (e.g., insulation), utility asset image 112-4 (e.g., power lines) utility asset image 112-5 (e.g., an ALS) and utility asset image 112-K (e.g., broken transmission line). The image sources 116 represent a variety of types of images sources, including drones and service crew cameras (e.g., smartphones or tablet computers). In various examples, the utility asset images 112 are captured on a periodic and/or asynchronous basis.

More generally, the utility asset images 112 can be referred to as infrastructure asset images. Infrastructure asset images can be images of industrial equipment. As demonstrated in FIG. 1, this industrial equipment can include, but is not limited to assets related to utility distribution systems (e.g., electrical distribution systems). In other examples, infrastructure asset images could be images of communications equipment, such as cell towers, antennas, fiber optic communication equipment, networking equipment, etc. In some examples, the infrastructure asset equipment can be material excavation and/or distribution equipment, such as gas and/or oil wells, pumps, tanks, etc. In still other examples, the industrial assets could be related to public infrastructure, such as roads, bridges, overpasses, dams, levies, etc. In fact, the infrastructure assets images can be images of nearly any registered (or registerable asset) that is likely to need servicing at some point, and where a condition and a state of such infrastructure asset can be determined from observation.

Additionally, in some instances, there can be multiple utility asset images 112 of the same utility assets. In these situations, there is a set of utility asset images 112 for a particular utility asset. In such a situation, each image of the set of utility asset images 112 is captured at a different angle. Thus, each of the first-Kth utility asset images 112-1 . . . 112-K (or some subset thereof) can have multiple associated images that are taken at various angles. Further, in some cases, a particular utility asset image 112 (that may or may not be a member of a set of utility asset images 112 for a particular utility asset) can include a bounding box with a label to assist classification.

In some examples, the server system 104 can represent multiple servers, such drone controlling servers that are employable to relay images captured by the image sources 116 to the image processing system 108. The server system 104 represents a computing platform, such as one or more servers that execute application software on top of an operating system.

The image processing system 108 can be implemented as a computing platform, such as one or more servers that execute application software on top of an operating system. That is, the image processing system 108 can include a processor 109 (e.g., one or more processing cores) and a non-transitory memory 110 that stores machine-readable instructions. The non-transitory memory 110 is implemented as a non-transitory machine-readable medium (volatile and/or non-volatile memory), such as random access memory (RAM), a hard disk drive, a solid state drive, flash memory or a combination thereof. The processor 109 can access the non-transitory memory 110 and execute machine-readable instructions. That is, execution of the machine-readable instructions causes the processor 109 to perform specific operations.

In some examples, the server system 104 and the image processing system 108 can communicate over a network 128 (e.g., a public network, such as the Internet or a proprietary network, such as a utility network) through a network interface 132 of the image processing system 108. In other examples, the server system 104 and the image processing system 108 can be integrated and operate on the same computing system. The image processing system 108 and/or the server system 104 could be implemented in a computing cloud. In such a situation, features of the image processing system 108 and/or the server system 104, such as the processor 109, the network interface, and the memory 110 could be representative of a single instance of hardware or multiple instances of hardware with applications executing across the multiple of instances (i.e., distributed) of hardware (e.g., computers, routers, memory, processors, or a combination thereof). Alternatively, the image processing system 108 and/or the server system 104 could be implemented on a single dedicated server.

The K number of asset images 112 represents images captured on a deployment of a drone or a service crew. For instance, in some examples, drones are deployed on a periodic basis to survey components of a utility grid. In other examples, the drones or service crews are deployed after an environmental event (e.g., a hurricane or tornado) to assess damages caused by the environmental event. In the present example, it is presumed that the K number of utility asset images 112 each include at least one utility asset (e.g., a feeder, a transformer, an insulator, a jumper, etc.).

The K number of images 112 are received by an image preprocessor 136 stored in the memory 110. The image preprocessor 136 is configured to normalize the K number of images 112. The normalization of the K number of images can include, for example, resizing the images (e.g., changing a resolution and/or cropping images) to a uniform size, converting the images to a common format, etc. The normalization of the K number of utility asset images 112 ensure that the K number of utility asset images 112 have uniform features (e.g., a uniform size, a uniform resolution, etc.). In particular, as noted, the image sources 116 represent multiple different image sources, and these different images sources can capture images with different resolutions, different viewing angles, etc. For example, as a fleet of drones changes, the resolution of images is likely to change as well. However, the normalization executed by the image preprocessor 136 modifies the images in a manner to curtail an impact of these differences. The image preprocessor 136 provides the (normalized) K number of utility asset images 112 to an asset condition generator 140.

In the examples, provided it is presumed that the utility asset images 112 include metadata, such as location information. The location information can be implemented, for example, as geographical coordinates (e.g., latitude and longitudinal coordinates). Additionally, the metadata can include time data that characterizes a date and time that a particular utility asset image 112 was captured. Further, in some examples, metadata of the utility asset images can include information about the image source 116 employed to capture a particular utility asset image 112. For instance, in situations where a particular utility asset image 112 is captured by a drone, the metadata can include information about the make and model of the drone and a flight date and time the drone was deployed to capture the particular utility asset image 112. Further, information related to a physical orientation of a gimble for a camera of the drone, a pitch, yaw and roll of the camera of the drone at the time the particular utility image is captured can be included as metadata.

As noted, the asset condition generator 140 can receive a set of utility asset images 112 for a particular utility asset image. In these examples, each image in the set of utility asset images 112 includes metadata indicating that the respective image is a member of the set of utility asset images 112. For instance, the metadata can include information indicating and order and a cardinality of the set of utility asset images 112.

The asset condition generator 140 includes an ML model 144. The ML model 144 analyzes the K number of images 112 to identify a type/category of a utility asset present in the K number of images 112 and to identify a state and/or a condition of the utility asset. As one example, consider the first utility asset image 112-1 of a transformer. In such a situation, the ML model 144 can determine that the first utility asset image 112-1 contains the transformer (e.g., the type of the utility asset) is coupled to a particular feeder (e.g., indicating a state), and has corrosion (e.g., indicating a condition). The condition and/or the state of a particular utility asset characterizes an operational status of the particular utility asset in some examples. More specifically, in some examples, the state of a particular utility asset identifies at least one other utility asset connected to the particular utility asset.

Figure 2:
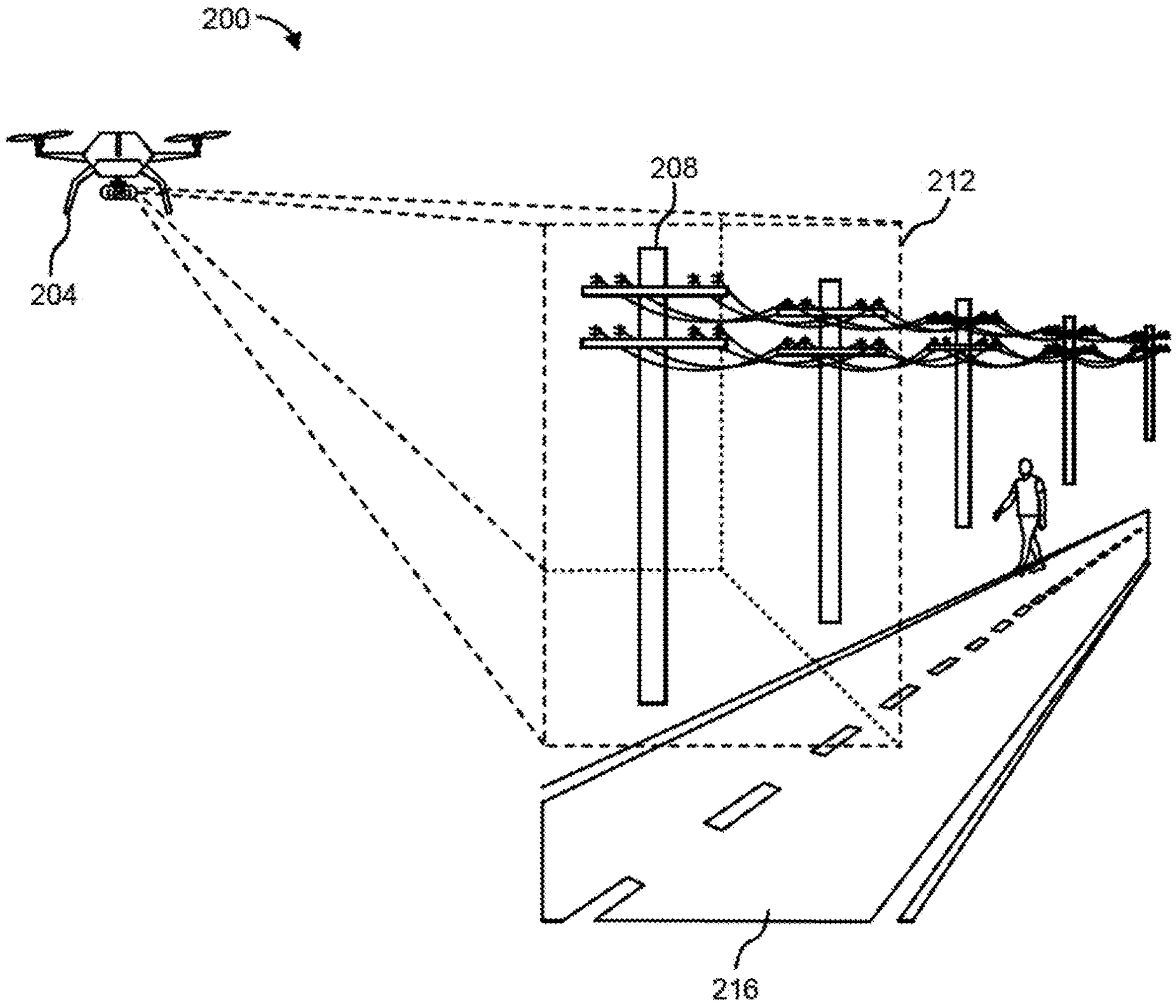
FIG. 2 illustrates an example of an environment where a drone captures a utility asset image.

FIG. 2 illustrates an example of an environment 200 where a drone 204 captures a utility asset image (e.g., one of the K number of images 112 of FIG. 1). The environment 200 includes a utility asset 208, namely a utility pole (alternatively referred to as an electrical pole, a telephone pole, etc.). The drone 204 captures an image of the utility asset 208. More specifically, the drone 204 captures a region bounded by a box 212 that includes the utility asset 208. Thus, the resultant utility image captured by the drone 204 includes the utility asset 208, as well as a portion of a road 216.

In the example illustrated, the utility image captured by the drone 204 could include metadata with a camera gimble orientation (e.g., roll, pitch and yaw), along with location information, such as GNSS (global navigation satellite system) data (e.g., latitude and longitude coordinates) for the drone 204. In various examples, the GNSS data can be implemented with GPS (global positioning system) data, GLONASS data, etc.

Referring back to FIG. 1, to determine a type (category) of a utility asset and a condition and/or a state of the particular utility asset image 112 is a utility image, consider analysis of the utility image captured in FIG. 2, the image captured by the drone 204 can include metadata that has the camera orientation and the location information for the drone 204. In such a situation, the asset condition generator 140 can, among other things, combine the location information with the camera orientation to calculate an oriented field-of-view as a 3D (three-dimensional) polygon. The 3-D polygon is employed by the asset condition generator 140 to search a utility asset database 148 that includes images of electrical poles and similar equipment. The utility asset database 148 can be referred to as an infrastructure asset database in other examples. Additionally or alternatively to the approach employing 3D polygons, the asset condition generator 140 can be programmed to execute a simple radius search based on a set distance from a center point of a particular utility asset image 112 to identify the utility asset in the utility asset image 112.

In situations where a match for a particular utility asset image 112 can be identified, the particular image is tagged as a utility image. In examples where no such match is found, the particular image can be discarded by the asset condition generator 140. Additionally, the asset condition generator 140 employs the ML model 144 to generate a descriptive tag (alternatively referred to as a caption) for the utility asset images 112 that characterize condition and/or a state of the utility asset present in the particular utility asset image 112. The ML model 144 is trained with images of utility assets in various conditions (operational, corroded, leaking, damaged, terminal points, etc.). Thus, the descriptive tag for the utility asset images 112 characterizes an operational state of utility assets visible in the utility asset images 112. In some examples, these images employed to train the ML model 144 are stored in the utility asset database 148 that is searchable by the ML model 144. Moreover, the ML model 144 of the asset condition generator 140 can employ the metadata associated with a particular utility asset image 112, including the location information and/or the orientation of the image sources 116 to generate the descriptive tag for the corresponding utility image. The descriptive tag of a particular utility image can characterize a type (e.g., a utility pole, a transformer, a feeder, a power line, an insulator, etc.) and a condition (e.g., functional, corroded, proximate to vegetation) and/or a state (e.g., termination points, feeder lines coupled thereto, etc.) of a particular utility asset visible in the particular utility asset image 112.

Figure 3:
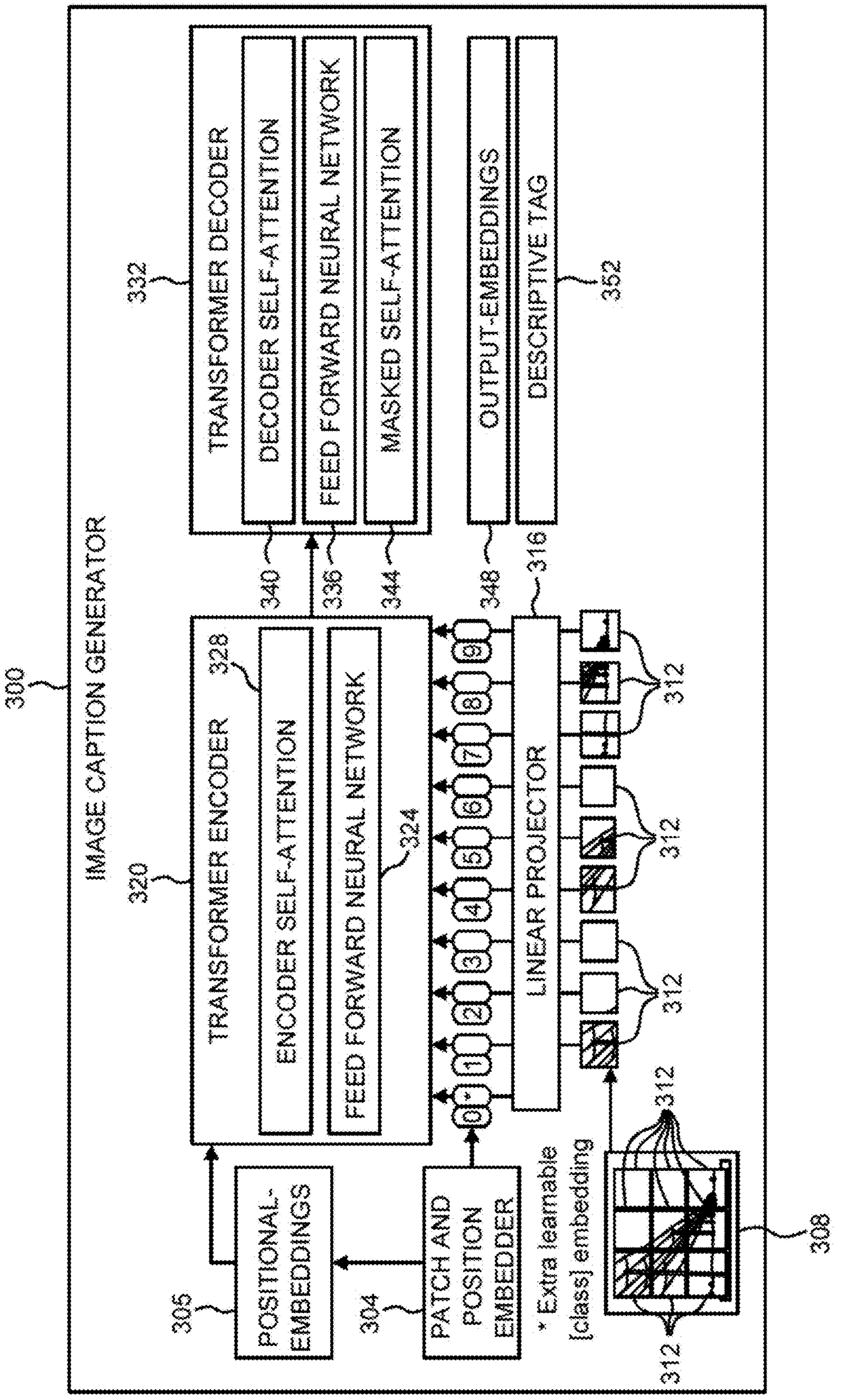
FIG. 3 illustrates a detailed diagram of a transformer-based neural network and the encoder/decoder portion of an asset condition generator that is employable to implement a portion of the asset condition generator of FIG. 1.

The ML model 144 of the asset condition generator 140 can be implemented with a transformer-based neural network with an encoding component for converting images (e.g., the utility asset images) into numerical vectors and a decoding component for converting the numerical vectors into descriptive text for the descriptive tags. FIG. 3 illustrates a detailed diagram of a transformer-based neural network and the encoder/decoder portion of an asset condition generator 300 that is employable to implement a portion of the asset condition generator 140 of FIG. 1.

The asset condition generator 300 includes a patch and position embedder 304 that receives an input image 308, such as one of the K number of images 112 of FIG. 1. The patch and position embedder 304 divides the input image 308 into patches 312. The patch and position embedder 304 flattens the patches 312 and linearly transforms the patches 312 into an embedding space.

As used herein, the embedding space refers to a continuous vector space in which high-dimensional data, (e.g., the input image 308) is transformed into lower-dimensional vectors. This transformation is designed to capture and preserve semantic relationships or features of the input image 308 in a manner that can be more easily processed and analyzed by ML algorithms. In an embedding space, each item or data point is represented as a vector, and the distance between vectors is intended to reflect the similarity or dissimilarity between the corresponding items. The embedding space enables operations on complex and abstract data types using standard vector arithmetic. The asset condition generator 300 can leverage this benefit for identifying objects in the input image 308.

The patch and position embedder 304 adds the location information and/or the camera orientation to the embedding space for the input image 308 to maintain the spatial relationships between the patches 312. This obviates the need for the patch and position embedder 304 to include any inherent notion of order or position of the patches 312. This association of location data with imagery is a technique employable to automatically assign metadata and/or descriptive tags to the input image 308 (or other images) which are employable to validate ML findings and/or the descriptive tags. The patch and position embedder 304 generates positional embeddings 305 for vectors that encode the position of a patch 312 within a sequence. The positional embeddings 305 are employable to give an ML model information about an order of the patches 312.

The embedding space for the (flattened) patches 312 of the input image 308 are provided to a linear projector 316. The linear projector 316 projects the flattened patches 312 linearly to match a dimensionality expected by a transformer encoder 320. This linear projection executed by the linear projector 316 provides a learned transformation that prepares the data of the input image 308 for processing by an ML model employed by the transformer encoder 320 (e.g., the ML model 144 of FIG. 1). The positional embeddings 305 are also provided to the transformer encoder 320.

The transformer encoder 320 includes a series of self-attention and feed-forward neural network layers. More specifically, the transformer encoder 320 includes an encoder self-attention layer 324 and a feed-forward neural network 328 (a trained ML model). The transformer encoder 320 processes a sequence of the flattened patches 312 (in the embedding space) by allowing each patch 312 to attend to the other patches (or some subset thereof), to capture global dependencies. The transformer encoder 320 outputs a sequence of encoded representations of the input image 308 that are rich in contextual information.

More specifically, the transformer encoder 320 handles sequential data for natural language processing (NLP). The encoder self-attention layer 324 (which can represent multiple layers) is responsible for modeling relationships between patches 312 in the input sequence. In self-attention, each patch 312 is able to attend to all other patches 312 in the input image 308, thereby enabling the model to capture context and dependencies regardless of a position of a particular patch 312. The encoder self-attention layer 324 computes attention scores that determine the influence of other patches 312 on a particular patch 312, effectively allowing the ML model of the transformer encoder 320 to weigh the importance of each patch 312 when producing the next representation of the patches 312.

The output of the encoder self-attention layer 324 is provided to the feed-forward neural network 328. This feed-forward neural network 328 includes two linear transformations with a non-linear activation function in between. The feed-forward neural network 328 operates on each position of the patches 312 separately and identically. Accordingly, the same feed-forward neural network 328 is applied to each position of the patches 312. The transformer encoder 320 thus transforms the input sequence into a series of output vectors that encapsulate both the individual elements and their contextual relationships, readying the data for text generation (e.g., a descriptive tag).

The output of the transformer encoder 320 is provided to a transformer decoder 332. The transformer decoder 332 is tasked with generating a descriptive tag (a type, a condition and/or a state) for the input image 308 from the encoded image representations. The transformer decoder 332 includes a feed-forward neural network 336, a decoder self-attention layer 340 and a masked self-attention layer 344.

The decoder self-attention layer 340 in a transformer decoder serves a similar purpose as the feed-forward neural network 328 of the transformer encoder 320. The decoder self-attention layer 340 allows each patch 312 to attend to previous tokens (e.g., units of text) in the sequence, facilitating the modeling of relationships and dependencies between tokens. In summary, the decoder self-attention layer 340 attends to the output of the transformer encoder 320, thus integrating the image context into the language model.

The feed-forward neural network 336 (a trained ML model) operates similar to the encoder self-attention layer 324 of the transformer encoder 320. The feed-forward neural network 336 transforms the attention output to help in predicting the next word in the caption. More generally, the feed-forward neural network 336 applies a position-wise, non-linear transformation to each token representation output by the decoder self-attention layer 340 after a particular token has been processed by the decoder self-attention layer 340. The output of the tokens from the attention mechanisms is independently passed through the feed-forward neural network 336, which has two linear layers with a non-linear activation function in between, typically expanding and then compressing the dimensions of the representations of the tokens. This process introduces additional complexity and depth to the ML model, enabling the capture of more intricate patterns in the data. The feed-forward neural network 336 operations are augmented by residual connections and layer normalization, which help in stabilizing the training of deep networks. The transformed representations from the feed-forward neural network 336 are employed to generate a final output sequence, contributing to an ability of the transformer decoder 332 to produce accurate and coherent text.

The output of the feed-forward neural network 336 is provided to the masked self-attention layer 344. The masked self-attention layer 344 enables the transformer decoder 332 to attend to all positions up to and including the current position in the output sequence. This attendance prevents future information from leaking into the prediction of the current word during training. The transformer decoder 332 provides output-embeddings 348 that are the transformed representations of the words that have been predicted so far. The transformer decoder 332 also outputs a descriptive tag 352 that presents a final generated type, condition and/or state for the utility asset present in the input image 308 based on the output-embeddings 348 and the masked self-attention layer 344.

Referring back to FIG. 1, as noted, the asset condition generator 140 generates the descriptive tag characterizing a type, condition and state of each asset visible in the utility asset images 112. Additionally, in some situations, the asset condition generator 140 also generates confidence scores for the type, condition and state included in the descriptive tag. The confidence score represents a predicted accuracy of the type, condition or state (respectively) included in the descriptive tag. If the confidence score for the type and/or the condition is below a threshold value (e.g., doesn't satisfy a threshold) for a particular utility asset image 112, the asset condition generator 140 flags these utility asset images for review provides the particular utility image to a rejected image analyzer 156 stored in the memory 110.

Figure 4:
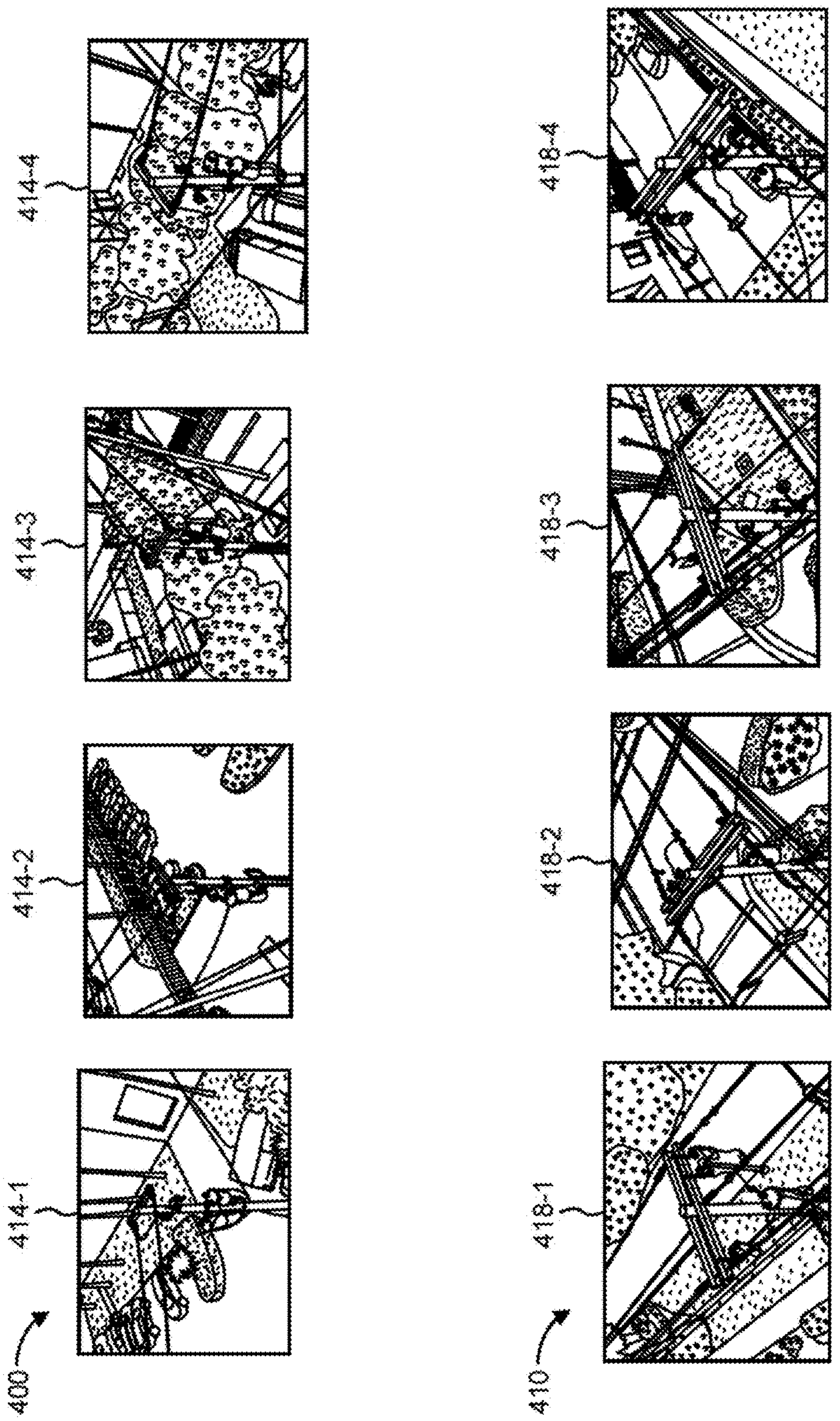
FIG. 4 illustrates a first set of utility asset images and a second set of utility asset images.

As noted, in some examples, metadata associated with a set of utility asset images 112 (e.g., a particular subset of the utility asset images 112) could indicate that the set of are associated with the same utility assets and/or components. FIG. 4 illustrates a first set of utility asset images 400 and a second set of utility asset images 410. The first set of utility asset images 400 includes four (4) utility asset images, namely a first utility asset image 414-1, a second utility asset image 414-2, a third utility asset image 414-3 and a fourth utility asset image 414-4. Each of the first-fourth utility asset images 414-1 . . . 414-4 of the first set of utility asset images include the same utility assets, namely transformers, but taken from different angles. Similarly, the second set of utility asset images 410 includes four (4) utility asset images, namely a first utility asset image 418-1, a second utility asset image 418-2, a third utility asset image 418-3 and a fourth utility asset image 418-4. The first-fourth utility asset images 418-1 . . . 418-4 of the second set of utility asset images 410 includes the same utility asset, namely a transformer, captured at different angles.

In this manner components of a particular utility asset may be visible on some of the first set of utility asset images 400, but not in others. Accordingly, in some situations, different images within the first set of utility asset images 400 may include indicators of a particular condition and/or state. For instance, in the example illustrated, suppose that one of the transformers had corrosion. In this situation, the corrosion might be visible in one utility asset image of the first set of utility asset images 400. Thus, an aggregation of information available in the first set of utility asset images 400 and the second set of utility asset images 410 increases a confidence of accuracy in predicting a type, condition and/or state of a particular utility asset.

Referring back to FIG. 1, by analyzing a set of utility asset images 112 for a particular utility asset, data from multiple images of the particular utility asset are employable to determine a comprehensive condition and/or state of the particular utility asset. Moreover, the comprehensive condition and/or state is employable to update or generate updating the descriptive tags associated with the utility asset images. In such a situation, each utility asset image of the set of utility asset images 112 can be analyzed in a similar manner. In situations where multiple conditions and/or states are detected in different utility asset images of the set of utility asset images 112, and the confidence score meet the threshold (e.g., satisfies the threshold), the particular utility asset depicted in the set of utility asset images 112 can be assigned multiple conditions and/or states. In situations where a first condition or state for a first utility asset image in the set of utility asset images 112 has a confidence score that meets the threshold value (e.g., satisfies the threshold) and a second condition or state has a confidence score that does not meet the threshold (e.g., does not satisfy the threshold), the asset condition generator 140 can be configured to assign the first condition or state to the set of utility asset images 112, but not the second condition or state.

Figure 5:
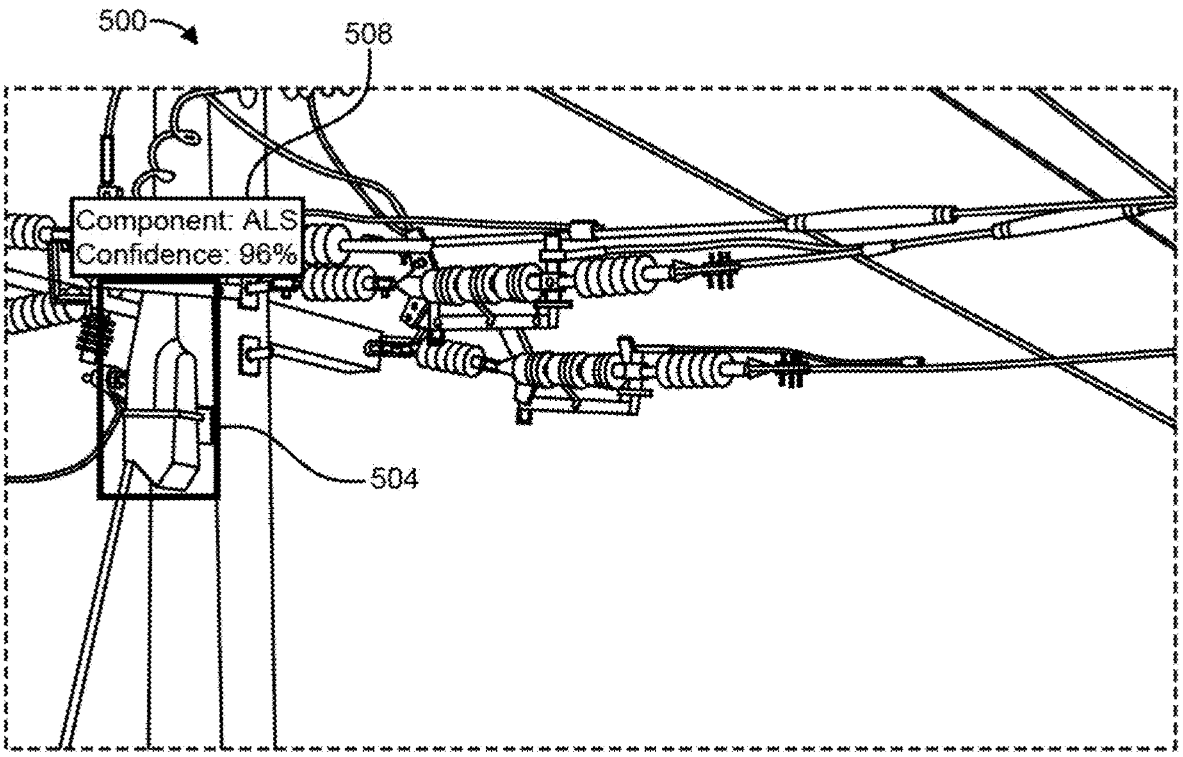
FIG. 5 illustrates an example of a utility asset image that includes a bounding box with a label that identifies a utility asset in the utility asset image.

As noted, in some examples, a particular utility asset image 112 can include a bounding box to assist the asset condition generator 140 in identifying the type, condition and/or state of the utility asset. FIG. 5 illustrates an example of a utility asset image 500 that includes a bounding box 504 with a label 508 that identifies a utility asset of an ALS. That is, the ALS is located within the bounding box 504. In the example illustrated, the bounding box 504 was added to utility asset image 500 after the utility asset image 500 was captured (e.g., by a user interface). However, in other examples, the bounding box could be a physical boundary that is present and used for identification.

Referring back to FIG. 1, in situations where the bounding box is included (such as the example utility asset image 500 of FIG. 5), the asset condition generator 140 can employ the label of the bounding box to confirm or refute the information in the descriptive tag. For instance, suppose that the asset condition generator 140 employes the ML model 144 on a particular utility asset image 112 and determines that the particular utility asset image 112 includes a jumper. However, in this situation, suppose that the bounding box indicates that the particular utility asset image 112 depicts a splice (rather than the jumper). Thus, the asset condition generator 140 updates the descriptive tag, and the confidence scores based on the information in the bounding box (e.g., changes the type of the utility asset from jumper to splice). Additionally, the asset condition generator 140 provides feedback to the ML model 144 indicating that the predicted type of the utility asset is incorrect. In response to this feedback, the ML model 144 adjusts parameters to improve the accuracy of predicting the type, condition and/or state of utility assets over time. In this manner, the ML model 144 is configured to perform reinforcement learning using the bounding box (or multiple bounding boxes) with integrated labels in a subset of the utility asset images 112 as verification data to reduce error rates in the identification (and categorization) of utility asset conditions and/or states.

Furthermore, in some situations, individual components of a utility asset are identified. For example, if a particular utility asset image 112 has a sufficiently high resolution, the asset condition generator 140 can employ object detection techniques to identify individual constituent components of the utility asset. For instance, suppose that a particular utility asset image 112 includes a transformer, such as the first utility asset image 112-1. In this situation, the asset condition generator 140 can identify terminals (e.g., components) of the transfer.

In examples where components in the utility assets have a confidence score for type, category and state (or some combination thereof) that meets the threshold value, the asset condition generator 140 can analyze the metadata (e.g., location data) of the corresponding utility asset image 112 to determine an identity of a component(s) in the utility asset image 112. The identity could be, for example, a unique identifier (ID) for the component, such as an ID of a transformer, a powerline, an ALS, etc. This unique ID can be added to the descriptive tag generated by the asset condition generator 140. In some examples, this information is employable to identify the state of a particular utility asset. For instance, consider the second utility asset image 112-2. In this situation, the illustrated jumper connects two power lines. In situations where the two power lines and the jumper have unique IDs, the state of the jumper (included in the descriptive tag) is employable to identify the power wires connected to the jumper.

As noted, utility asset images 112 with a confidence score for the type, condition and/or state that is below the threshold value (e.g., does not satisfy the threshold) can be flagged for review and provided to the rejected image analyzer 156. The rejected image analyzer 156 analyzes each utility asset image 112 that has a confidence score for the predicted type, condition or state that is below the threshold value (e.g., does not satisfy the threshold). The rejected image analyzer 156 is configured to analyze metadata of received images and/or historical data to determine if a particular image source 116 needs maintenance. For instance, if a particular drone consistently has a high number (e.g., 20% or more) of the utility asset image 112 captured by the particular drone, the rejected image analyzer 156 can generate a message for the server system 104 indicating that the particular drone (e.g., an instance of the image sources 116) needs maintenance and/or inspection (e.g., camera cleaning, gimbal maintenance, etc.). In this manner, the image processing system 108 provides feedback on the quality of the utility asset images 112 captured by the image sources 116.

The asset condition generator 140 can store the utility asset images 112 along with in the utility asset database 148 along with the unique ID. In some examples, the asset condition generator 140 creates new records in the utility asset database 148 that includes a utility asset image 112 and the descriptive tag. Additionally or alternatively, the asset condition generator 140 updates and/or augments records associated with particular utility assets with the utility asset images 112 and descriptive tags that characterize the type, condition and/or state of the utility assets depicted in the utility asset images 112.

The asset condition generator 140 also generates and/or updates an indexed list 160. The indexed list includes the unique ID of the utility asset images, the metadata (or some portion thereof), along with the descriptive tags. The indexed list can be, for example, a spreadsheet, such as a CSV (commas separated variable) file, an Office Open XML (extensible markup language) file, a spreadsheet file in a proprietary format, etc. In some examples, each unique ID (e.g., a row in the indexed list) can include a link to the utility asset database 148 to facilitate retrieval of the corresponding utility image.

FIG. 6A illustrates an example of a schema 600 for an indexed list, such as the indexed list 160 of FIG. 1. The schema includes the unique ID, labeled as "index". The unique ID is a key field that is employable to search an asset image database, such as the utility asset database 148 of FIG. 1. The schema 600 also includes a first set of metadata fields 604 that characterizes features related to the utility image itself, such as characteristics of the device employed to capture the utility image, the date/time the image was taken, etc. The first set of metadata fields 604 also includes a URI (uniform resource identifier) that characterizes a location of a particular utility asset image 112.

The schema 600 includes a second set of metadata fields 608. The second set of metadata fields 608 includes metadata added by a condition generator (e.g., the asset condition generator 140 of FIG. 1). The second set of metadata fields 608 includes metadata related to the utility asset present in a particular utility image. In other examples, the other types of data fields could be present in the first set of metadata fields 604 and/or the second set of metadata fields 608. Further, the schema 600 includes a descriptive tag labeled "TAG" that is implemented with delineated text generated by an asset condition generator (e.g., the asset condition generator 140 of FIG. 1). By use of the schema 600, an indexed list implemented with this schema 600 would enable retrieval of a particular utility image, along with the fields included in the first set of metadata fields 604 and the second set of metadata fields 608. In some examples, the descriptive tag can include a unique ID of other utility assets, such as in situations where a particular utility asset is a jumper that connects two other utility assets (e.g., the unique ID of the two other utility assets are included in the descriptive tag).

The schema 600 is employable for indexing sets of utility asset images as well. In such a situation, the index number can include an indicator that a particular utility asset image is a member of a set of utility asset images. For instance, suppose that a unique ID of 'X' is assigned to a set of utility asset images, where X is a non-zero positive integer. In this situation, the unique ID of an ith utility asset image in a set of j number of utility asset images could have a unique ID of X.i.j. In this manner, the index number can include both an order and a cardinality of the set of utility asset images. Thus, the second utility asset image of a set of five (5) utility asset images could have a unique ID of X.2.5. It is noted that this is only one example, as there are numerous other ways that the unique ID could be assigned to individual utility asset images in a set of utility asset images. Additionally, this allows individual images of the set of utility asset images to be indexed, while maintaining as association of the utility asset images for a particular utility asset.

FIG. 6B illustrates a table 650 that has examples of text codes (e.g., abbreviations) that could be included in the descriptive tag added to the index list (e.g., in the "TAG" field). The text codes can include failure states for utility assets. The particular examples provided in the table 650 is not meant to be exhaustive. In other examples, there could be more or less such text codes.

Referring back to FIG. 1, the memory 110 includes a user interface module 164 that can provide a user interface (such as a web portal or other graphical user interface) for searching the utility asset database 148 and/or the indexed list 160. The user interface provided by the user interface module 164 can display images on a map based on the location information and to allow users to filter images by specific types of damage and/or infrastructure elements identified in the descriptive tags of the set of utility asset images.

The user interface module provides a prompt that enables querying the utility asset database using NLP (natural language processing) and/or Boolean operations to retrieve information about utility asset conditions and associated images. Further, the user interface enables search criteria based on an employee role, and the user interface provides images of the set of utility asset images and associated data relevant to the employee role. More particularly, the user interface facilitates searches within the utility asset database 148 and/or the indexed list 160. The user interface module 164 offers searchable/filterable fields that permit user input for locating utility assets by specifying information such substations, feeder numbers or geographical identifiers including addresses or zip codes. Stated differently, the user interface enables filtering the indexed list 160 and/or records on the utility asset database 148 based on specific criteria related to the descriptive tags and location information embedded in the utility asset images. Upon entry of such criteria, the user interface module 164 accesses the indexed list 160 to extract metadata and a unique ID corresponding to utility asset images that meet the search parameters. Additionally, the user interface module 164 accesses the utility asset database 148 to retrieve utility asset images linked to the unique identifier. The metadata, or a selected subset thereof, along with descriptive tags and the utility asset images, are displayed on the user interface provided by the user interface module 164.

Additionally, in some examples, the user interface module 164 can access an external data source 168 for geographic images, such as street view images, satellite images of a geographic region, etc. The external data source could be, for example, a searchable database of geographic images. These images can be output in addition to (or instead of) the utility asset images in some situations.

Figure 7A:
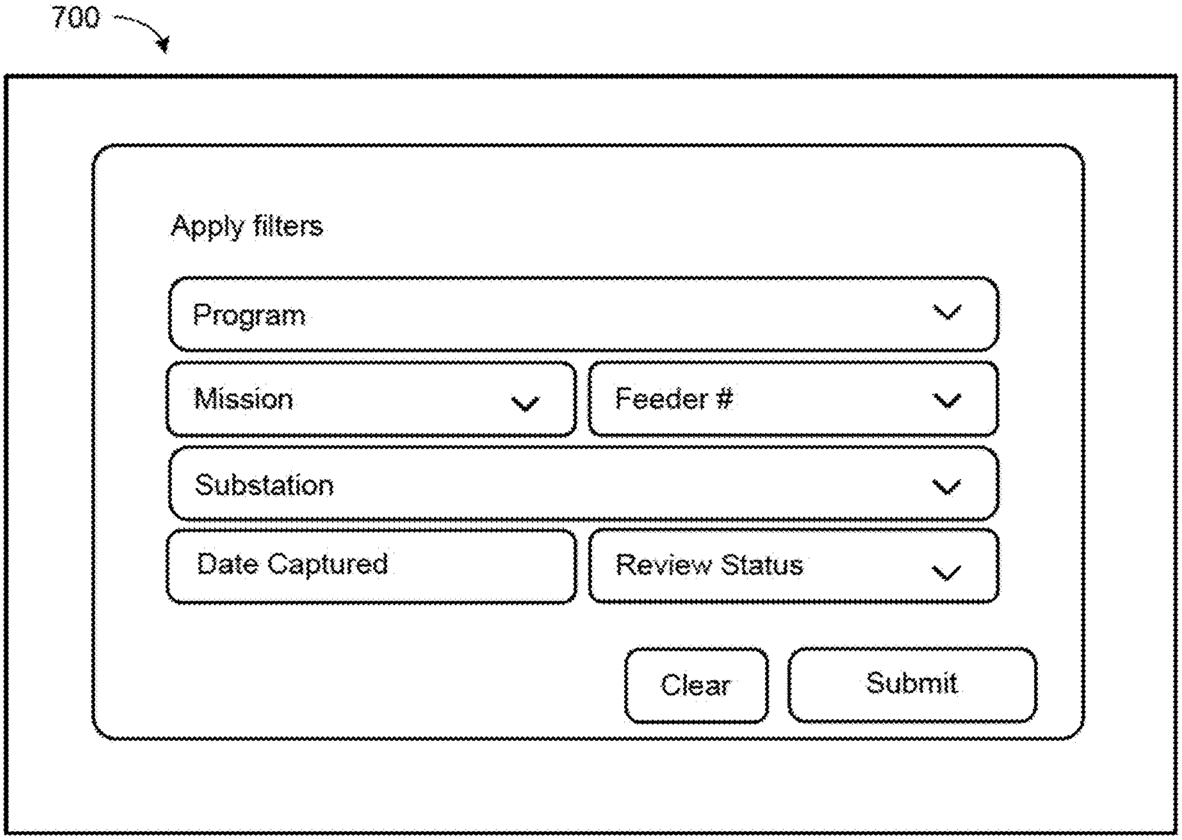
FIG. 7A illustrates a dashboard for the user interface that includes searchable fields that apply filters.
Figure 7B:
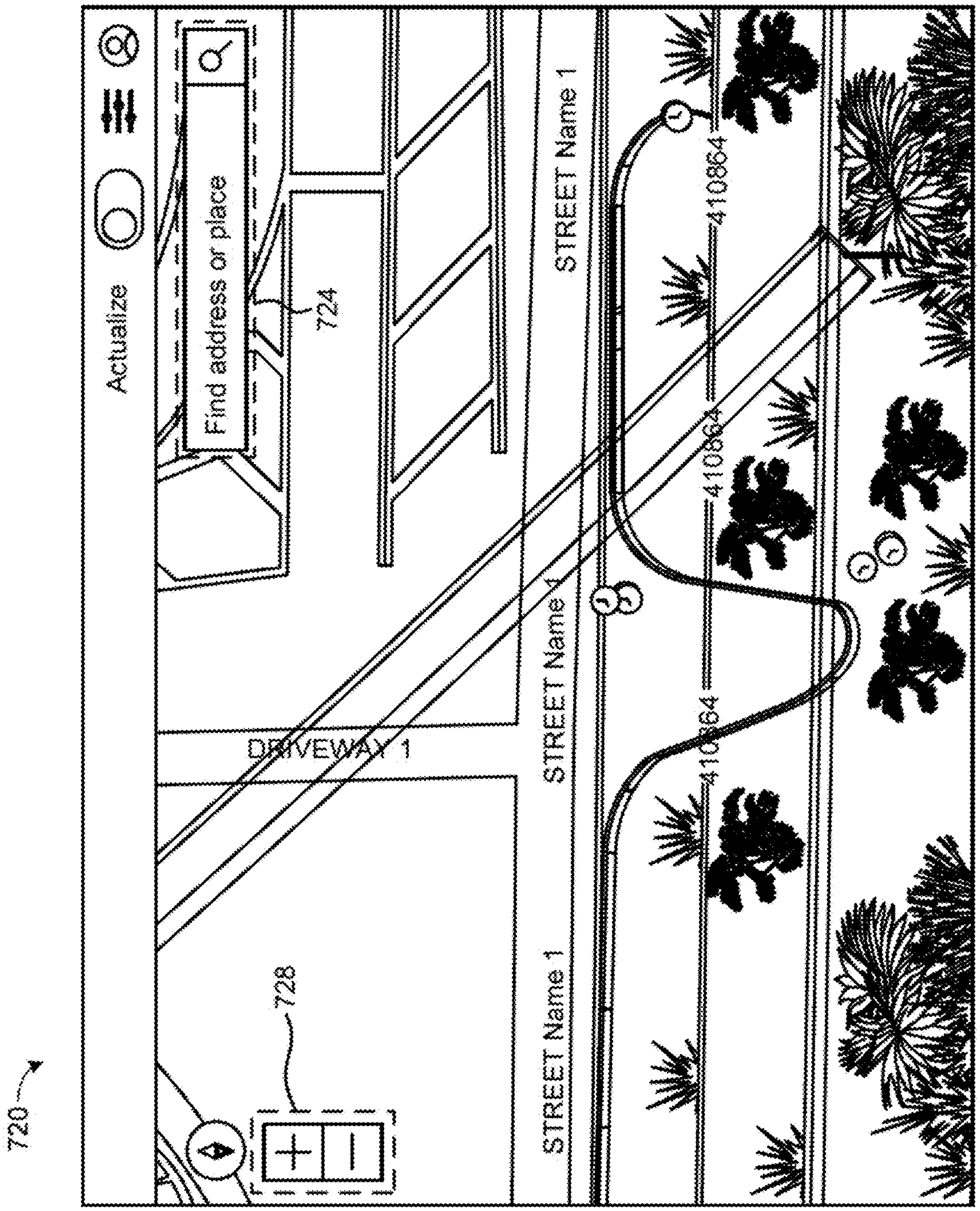
FIG. 7B-7D illustrate example outputs for the user interface of FIG. 7A.
Figure 7C:
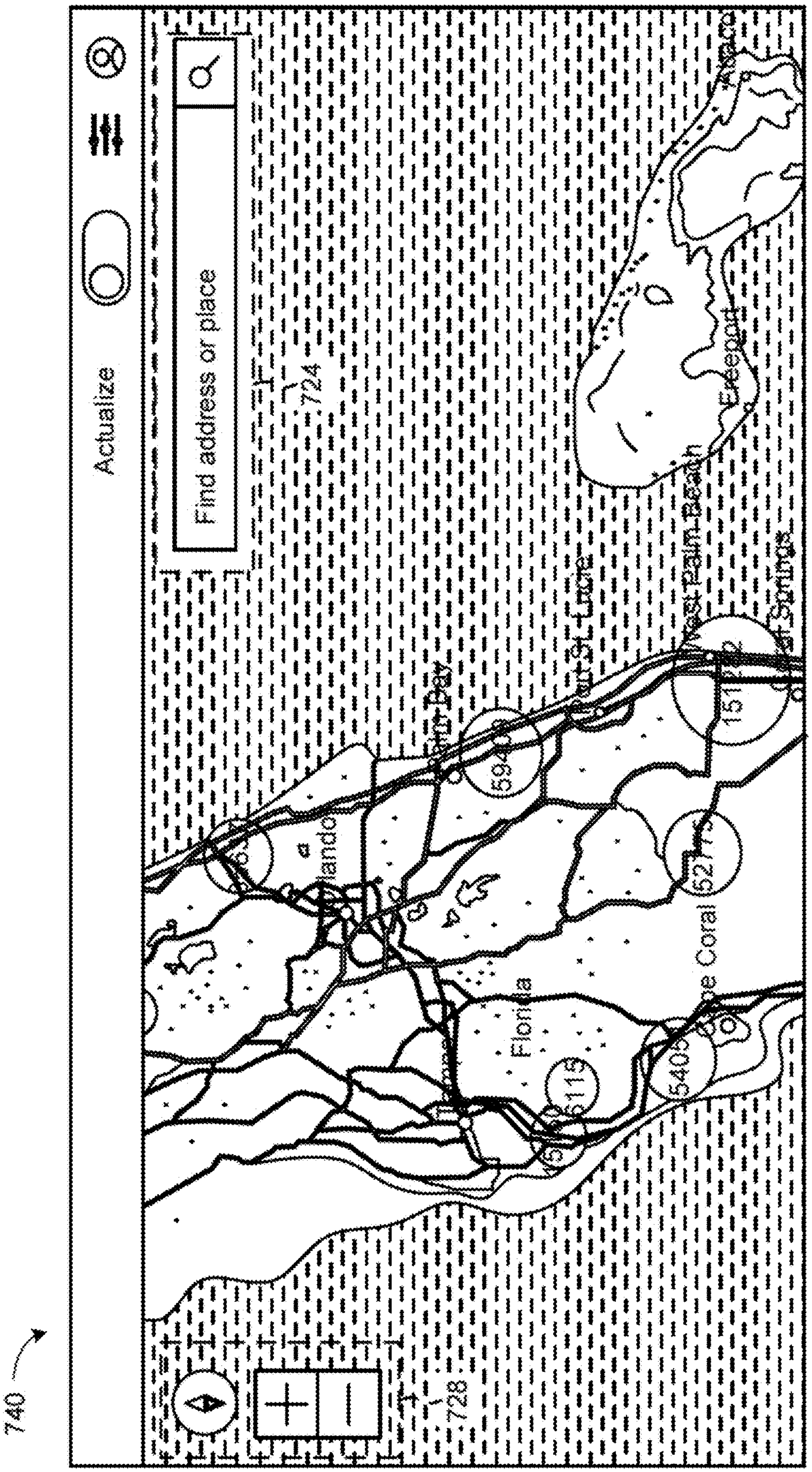
Figure 7D:
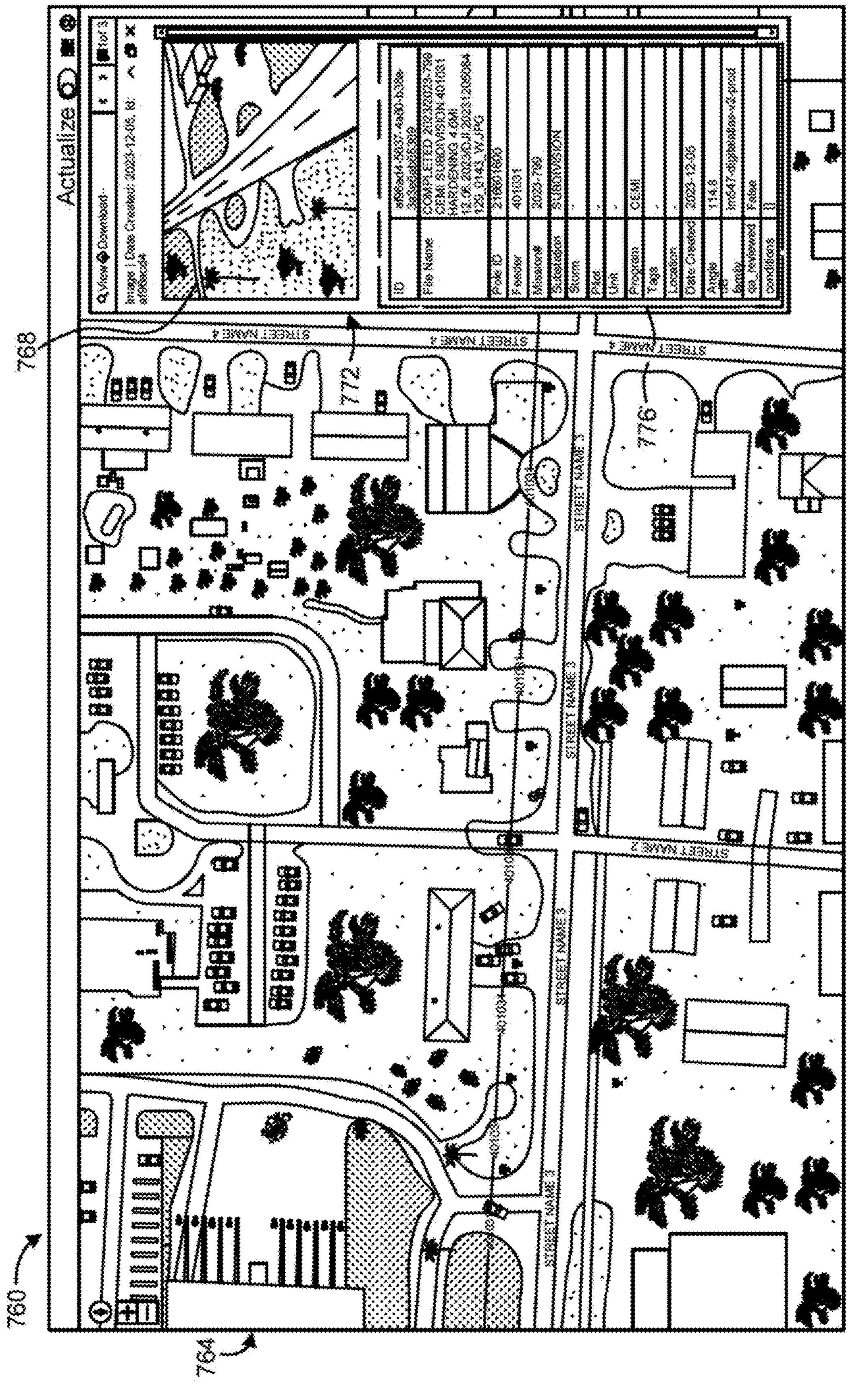

FIGS. 7A-7D illustrates an example of a user interface that provides search fields and outputs for the user interface. The user interface is employable to implement the user interface provided by the user interface module 164 of FIG. 1. FIG. 7A illustrates a dashboard 700 for the user interface that includes searchable fields that apply filters. More particularly, the user input to the dashboard 700 enables filtering of utility asset images by specific types of conditions and/or infrastructure elements identified in the descriptive tags the utility asset images. In the example illustrated, suppose that a particular feeder number is selected. In response, an image of the feeder with the selected feeder number is provided as a first output image 720 in FIG. 7B. The first output image 720 includes a location search field 724 that is employable to update the search. Additionally, the first output image 720 includes controls 728 that provide the option to pan or zoom to change an area of view. In particular, suppose that a "zoom out" option is selected. In this situation, a second output image 740 can be provided, as illustrated in FIG. 7C a wider geographic region (e.g., a map) is displayed in the second output image 740. The image of the wider geographic region (e.g., a satellite image) in the second output image 740 can be provided from an external data source. The second output images includes the location search field 724 and the controls 728. Suppose that a specific address is provided to the location search field 724. In such a situation, a third output image 760 can be provided, as illustrated in FIG. 7D.

The third output image 760 includes a satellite image 764 and a utility asset image 768. Moreover, the utility asset image 768 is output in a window 772 that includes metadata 776 for the utility image. In this manner, the operational status of a utility asset (e.g., an electrical pole) can quickly be ascertained from the descriptive tag by a user of the user interface.

Referring back to FIG. 1, the memory 110 also includes a priority engine 166. The priority engine 166 can access the utility asset database 148 and/or the indexed list 160 to generate a list of utility assets that need maintenance and assign a priority of such maintenance. More specifically, the priority engine 166 accesses the utility asset database 148 and/or the indexed list and selects utility assets that need maintenance based on information in corresponding descriptive tags. In some examples, this list can be referred to as a prioritized list.

As an example of generation of the prioritized list, in situations where the descriptive tag of a particular utility asset image 112 stored in the utility asset database 148 indicates that there is corrosion on a utility asset, this utility asset can be assigned a priority (e.g., a medium priority) and added to the prioritized list. Further, in examples where the utility asset database 148 indicates (e.g., through the descriptive tag) that a state of a particular utility asset has changed (e.g., establishing a previously recorded connection of two other utility assets), these assets can be added to prioritized list and can be assigned a priority (e.g., a low priority). Additionally, in examples where the condition of the particular utility asset indicates that the utility asset is experiencing a failure (e.g., such as in the Kth utility asset image 112-K), the priority engine 166 can assign this particular utility asset a priority (e.g., a high priority) and add this particular utility asset to the prioritized list.

Additionally, the priority engine 166 can include a ML model that can be trained to predict a change in conditions of utility assets. In such a situation, suppose that a descriptive tag of a particular utility asset indicates that the particular utility asset is proximate to vegetation and/or experiencing corrosion. In these examples, this condition is likely to worsen over time. The ML model of the priority engine 166 can be trained to predict when the assigned priority of such a condition changes (e.g., changes from a medium priority to a top priority).

The priority engine 166 can provide the prioritized list (e.g., the list of utility assets that need maintenance, along with the assigned priorities) to a ticket system interface 170. The ticket system interface 170 can include a module (e.g., an API (application programming interface)) to communicate with a service ticket system 172 through the network 128. The service ticket system 172 can manages and generates service tickets to deploy service crews for maintenance of specified utility assets. In some examples, responsive to the prioritized list, the ticket system interface 170 can automatically generate an investigation request for the service ticket system 172 for one or more utility assets on the prioritized list. In some examples, the service ticket system 172 can automatically generate a trouble ticket in response to the investigation request. In other examples, a review/approval procedure may be employed.

Figure 8:
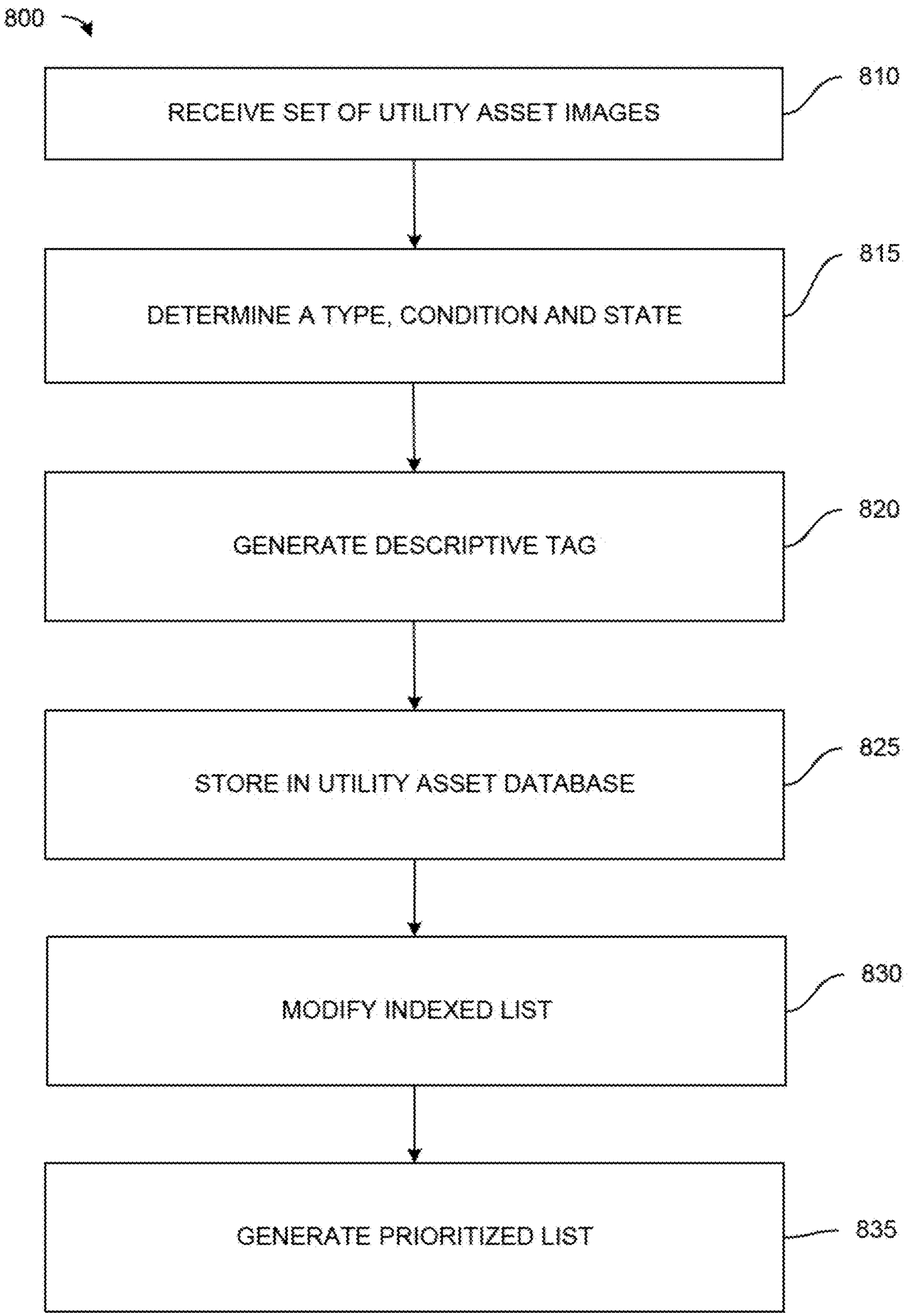
FIG. 8 illustrates a flow diagram of an example method of generating descriptive tags for utility asset images.

In view of the foregoing structural and functional features described above, an example method will be better appreciated with reference to FIG. 8. While, for purposes of simplicity of explanation, the example method of FIG. 8 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 8 illustrates a flow diagram of an example method 800 for processing utility asset images. The method 800 could be implemented by the system 100 of FIG. 1. At block 810, an asset condition generator (e.g., the asset condition generator 140 of FIG. 1) executing on a computer (e.g., the image processing system 108 of FIG. 1) receives a set of utility asset images (e.g., the utility asset images 112 of FIG. 1) captured by an image source (e.g., one of the image sources 116 of FIG. 1). At block 815, the asset condition generator analyzes the set of the utility asset images using an ML model to determine a type, condition and/or of a particular utility asset depicted in the set of utility asset images. The set of utility asset images includes at least two images of the particular utility asset captured at different angles. The asset condition generator can execute object detection techniques within the ML model to identify specific components of the particular utility asset in the set of utility asset images. At block 820, the asset condition generator generates a descriptive tag for the set of utility asset images based on the determined type, condition and/or state. The descriptive tag indicate an operational status of the particular utility asset in the set of utility asset images. At block 825, the utility asset generator stores the set of utility asset images and the corresponding descriptive tag in a utility asset database (e.g., the utility asset database 148 of FIG. 1).

At block 830, the asset condition modifies an indexed list (e.g., the indexed list 160 of FIG. 1) to add unique identifiers for the set of utility asset images, metadata associated with the utility asset images, and the descriptive tags. The indexed list is accessible through a user interface to retrieve the utility asset images and the descriptive tags stored in the utility asset database.

At block 835, a priority engine (e.g., the priority engine 166 of FIG. 1) executing on the computer generates a prioritized list of utility assets needing maintenance, each utility asset on the prioritized list of utility assets includes an assigned priority. To generate the prioritized lit of utility assets, the priority engine accesses the utility asset databased and/or the indexed list and selects the utility assets that have a condition or state (indicated in the descriptive tags) indicating that the corresponding utility asset needs maintenance (e.g., corrosion present).

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Also as used herein, the term "set" means one or more elements (e.g., where the elements can be anything, such as images, etc.), a "subset" of a set A refers to any set B where every element of set B is an element of set A (note that for every set A, set A is a subset of set A, as every element of set A is an element of set A), and a "proper subset" of a set A refers to a subset B of set A that is not set A, such that set A includes at least one element that is not in subset B. Additionally, where the disclosure or claims recite "a," "an," "a first," or "another" element, or the equivalent thereof, it should be interpreted to include one or more than one such element, neither requiring nor excluding two or more such elements.

What is claimed is:

1. One or more non-transitory computer storage media encoded with computer program instructions that when executed by one or more computers cause the one or more computers to perform operations comprising:

analyzing a set of utility asset images of a particular utility asset using a machine learning (ML) model to identify a type and condition of the particular utility asset depicted in the set of utility asset images, wherein the identified condition is assigned a confidence score, and the set of utility asset images comprises at least two images of the particular utility asset captured at different angles;

generating a descriptive tag for the set of utility asset images based on the identified type and condition, wherein the descriptive tag characterizes an operational status of the particular utility asset; and storing the set of utility asset images and the generated descriptive tag in a utility asset database, wherein the utility asset database stores images of utility assets, wherein the ML model is configured to learn using labels associated with a subset of the set of utility asset images as verification data to reduce error rates in the generation of descriptive tags that include utility asset conditions.

2. The media of claim 1, wherein the operations comprise:

accessing the utility asset database and selecting utility assets that need maintenance based on information in a corresponding descriptive tag;

generating a prioritized list of utility assets needing maintenance based on the selecting, wherein each utility asset on the prioritized list of utility assets includes an assigned priority; and providing the prioritized list to an interface for a ticket service system that manages service tickets for service crews.

3. The media of claim 1, wherein the operations comprise utilizing object detection techniques within the ML model to identify specific components of the particular utility asset in the set of utility asset images, wherein the descriptive tag of the set of utility asset images indicates the condition of the identified components.

4. The media of claim 3, wherein the operations comprise:

receiving metadata associated with the set of utility asset images, the metadata including information identifying a source of the set of utility asset images; and flagging utility asset images of the set of utility asset images with a condition having a confidence score that does not satisfy a threshold for review.

5. The media of claim 4, wherein the operations comprise:

receiving the flagged utility asset images;

identifying image sources associated with the flagged utility asset images; and providing feedback to a server for the image sources of the flagged utility asset images.

6. The media of claim 1, wherein the operations comprise updating an indexed list for utility asset images comprising a unique identifier (ID) for each image of the set of utility asset images, a corresponding descriptive tag for each image of the set of utility asset images, a link to the utility asset database for each image of the utility asset images and metadata including location information associated with each image in the utility asset images.

7. The media of claim 6, wherein the operations comprise providing a user interface for querying the utility asset database using natural language processing to retrieve information about utility asset conditions and associated images.

8. The media of claim 7, wherein the user interface is configured to display images on a map based on the location information and enable filtering images by specific types of conditions and/or infrastructure elements identified in descriptive tags for the utility asset images.

9. The media of claim 1, wherein the descriptive tag includes a determined state of the particular utility asset, and the state of the particular utility asset identifies at least one other utility asset connected to the particular utility asset.

10. A system for managing utility asset conditions, the system comprising:

a non-transitory memory for storing data and machine-readable instructions;

at least one processor that accesses the non-transitory memory, wherein the machine-readable instructions are operable, when executed by the at least one processor, to cause the at least one processor to perform operations comprising:

processing a set of utility asset images using a machine learning (ML) model to identify a type and condition of a particular utility asset depicted in the set of utility asset images, wherein the set of utility asset images comprises at least two images of the particular utility asset captured at different angles;

generating a descriptive tag for the set of utility asset images based on the identified type and condition, wherein the descriptive tags characterize operational status of the particular utility asset;

storing the set of utility asset images and the generated descriptive tag in a utility asset database, wherein the utility asset database stores images of utility assets;

providing a user interface for search criteria to search the utility asset database; and displaying search results that includes identified utility asset images along with corresponding descriptive tags and associated metadata.

11. The system of claim 10, wherein the operations comprise:

modifying an indexed list that includes unique identifiers for the set of utility asset images, metadata associated with the set of utility asset images, and the descriptive tags, and wherein the user interface enables:

searching of utility asset images based on the indexed list; and displaying search results on the user interface, including images and associated descriptive tags corresponding to search criteria input by a user.

12. The system of claim 10, wherein the operations comprise:

receiving metadata associated with the set of utility asset images, the metadata including information identifying a source of the set of utility asset images; and flagging the utility asset images of the set of utility asset images with a condition having a confidence score that do not satisfy a threshold for review.

13. The system of claim 10, wherein the ML model comprises a transformer-based neural network that includes:

an encoding component for converting the utility asset images of the set of utility asset images into numerical vectors; and a decoding component for converting the numerical vectors into the descriptive tag.

14. The system of claim 10, wherein the operations comprise:

accessing the utility asset database and selecting utility assets that likely need maintenance based on information in corresponding descriptive tags;

generating a prioritized list of utility assets likely needing maintenance based on the selecting, wherein each utility asset on the prioritized list of utility assets includes an assigned priority; and providing the prioritized list to an interface for a ticket management system that manages service tickets for service crews.

15. The system of claim 10, wherein the operations comprise:

providing the user interface for search criteria to search the utility asset database based on asset types, conditions and/or geographical locations, wherein the user interface includes input search criteria for searching an indexed list of the utility asset images to identify relevant utility asset images.

16. A method comprising:

receiving, by an asset condition generator executing on a computer, a set of infrastructure asset images captured by image sources;

analyzing, by the asset condition generator, the set of infrastructure asset images using a machine learning (ML) model to determine a condition of a particular infrastructure asset depicted in the set of infrastructure asset images, wherein the set of infrastructure asset images comprises at least two images of the particular infrastructure asset captured at different angles, generating, by the asset condition generator, a descriptive tag for the set of infrastructure asset images based on the determined condition, wherein the descriptive tags indicate an operational status of the particular infrastructure asset;

storing, by the asset condition generator, the set of infrastructure asset images and the generated descriptive tag in an infrastructure asset database, wherein the infrastructure asset database stores images of infrastructure assets; and providing a user interface that (i) facilitates searching of the infrastructure asset database using an indexed list including unique identifiers and that (ii) displays search results data associated with the infrastructure asset database.

17. The method of claim 16, comprising:

employing, by the asset condition generator, metadata associated with the set of infrastructure asset images to verify an accuracy of the descriptive tags generated by the ML model; and flagging, by the asset condition generator, infrastructure asset images of the set of infrastructure asset images with a condition having a confidence score that does not satisfy a threshold for review.

18. The method of claim 16, comprising:

modifying, by the asset condition generator, the indexed list including unique identifiers for the set of infrastructure asset images, metadata associated with the infrastructure asset images, and the descriptive tag.

19. The method of claim 18, comprising:

generating a prioritized worklist for a service ticket system based on conditions identified in descriptive tags stored in the infrastructure asset database and/or the indexed list; and sending maintenance requests to the service ticket system for deploying service crews to address the conditions identified as requiring attention.

* * * * *